United States Patent
Daum et al.

(10) Patent No.: US 10,112,807 B2
(45) Date of Patent: Oct. 30, 2018

(54) SUPPORTING LEG AND SUPPORTING CONSTRUCTION FOR A WORKING MACHINE

(71) Applicant: Putzmeister Engineering GmbH, Aichtal (DE)

(72) Inventors: Eva Daum, Filderstadt (DE); Andreas Benz, Wendlingen (DE); Dietmar Fuegel, Wolfschlugen (DE)

(73) Assignee: Putzmeister Engineering GmbH, Aichtal (DE)

( * ) Notice: Subject to any disclaimer, the term of this patent is extended or adjusted under 35 U.S.C. 154(b) by 31 days.

(21) Appl. No.: 15/110,459

(22) PCT Filed: Sep. 1, 2015

(86) PCT No.: PCT/EP2015/069945
§ 371 (c)(1),
(2) Date: Jul. 8, 2016

(87) PCT Pub. No.: WO2016/045916
PCT Pub. Date: Mar. 31, 2016

(65) Prior Publication Data
US 2016/0347590 A1    Dec. 1, 2016

(30) Foreign Application Priority Data
Sep. 26, 2014 (DE) .......... 10 2014 014 038

(51) Int. Cl.
*B66C 23/78* (2006.01)
*G01D 5/02* (2006.01)

(52) U.S. Cl.
CPC .............. *B66C 23/78* (2013.01); *G01D 5/02* (2013.01)

(58) Field of Classification Search
CPC .. B66C 23/78; B66C 23/80; E02F 9/08; E02F 9/085; B60S 9/02; B60S 9/04; B60S 9/10; B60S 9/12; G01D 5/02
See application file for complete search history.

(56) References Cited

U.S. PATENT DOCUMENTS 3,020,858 A * 2/1962 Perkins ................ B60F 1/00
                                                    105/27
3,708,937 A   1/1973 Sterner
(Continued)

FOREIGN PATENT DOCUMENTS

DE   20 02 090 A   9/1970
DE   21 14 501 A   3/1972
(Continued)

OTHER PUBLICATIONS

International Search Report of PCT/EP2015/069945, dated Jan. 11, 2016.
(Continued)

*Primary Examiner* — Minh Truong
*Assistant Examiner* — Juan J Campos, Jr.
(74) *Attorney, Agent, or Firm* — Collard & Roe, P.C.

(57) ABSTRACT

A supporting leg for a working machine that has a mast includes a hollow body, which is composed of two web plates arranged at a distance from each other and two flange plates, which connect the web plates to each other and are arranged at a distance from each other and are connected to the web plates by welds, and a supporting foot protruding downward from the hollow body. The web plates each have two substantially vertically arranged broad sides and two substantially horizontally arranged narrow sides that connect the broad sides to each other. The flange plates each have two substantially horizontally arranged broad sides and two substantially vertically arranged narrow sides that connect the broad sides to each other. The flange plates each lie (Continued)

against broad sides of the web plates facing each other via the narrow sides of the flange plates and the narrow sides of the web plates are exposed and form lower and upper contact surfaces of the hollow body.

12 Claims, 7 Drawing Sheets

(56) References Cited

U.S. PATENT DOCUMENTS

| | | | |
|---|---|---|---|
| 3,719,403 A | 3/1973 | Sung | |
| 3,953,052 A * | 4/1976 | Palmcrantz | B66C 23/78 248/354.1 |
| 4,027,801 A | 6/1977 | Johnston et al. | |
| 4,067,595 A * | 1/1978 | Vigerie | B66C 23/80 280/766.1 |
| 4,068,384 A * | 1/1978 | Holy | G01B 5/043 33/776 |
| 4,084,777 A * | 4/1978 | Lambert | B66C 23/80 212/304 |
| 4,118,054 A * | 10/1978 | Vigerie | B66C 23/80 212/304 |
| 4,424,985 A | 1/1984 | Holmes | |
| 4,593,932 A | 6/1986 | Miyazawa | |
| 4,809,615 A * | 3/1989 | Brickett | B60F 1/043 104/266 |
| 6,516,917 B1 | 2/2003 | Mayer et al. | |
| 7,150,472 B1 * | 12/2006 | Schneider | B66C 23/80 280/766.1 |
| 7,594,679 B1 * | 9/2009 | Schneider | B66C 23/80 280/763.1 |
| 8,757,663 B1 * | 6/2014 | Glazer | B60S 9/12 280/763.1 |
| 2003/0038466 A1 * | 2/2003 | Fugel | E04G 21/0436 280/765.1 |
| 2007/0084813 A1 * | 4/2007 | Morath | B66C 23/78 212/175 |
| 2012/0173094 A1 * | 7/2012 | Steinich | B66C 23/78 701/50 |

FOREIGN PATENT DOCUMENTS

| | | |
|---|---|---|
| DE | 21 49 511 A | 5/1972 |
| DE | 27 02 850 A1 | 7/1977 |
| DE | 39 40 798 A1 | 2/1991 |
| DE | 198 40 151 A1 | 3/1999 |
| JP | S 60-28563 U | 2/1985 |
| JP | H 10-265177 A | 10/1998 |

OTHER PUBLICATIONS

German Search Report in 10 2014 014 038.5 dated Aug. 25, 2015, with English translation of relevant parts.

* cited by examiner

SUPPORTING LEG AND SUPPORTING CONSTRUCTION FOR A WORKING MACHINE

CROSS REFERENCE TO RELATED APPLICATIONS

This application is the National Stage of PCT/EP2015/069945 filed on Sep. 1, 2015, which claims priority under 35 U.S.C. § 119 of German Application No. 10 2014 014 038.5 filed on Sep. 26, 2014, the disclosure of which is incorporated by reference. The international application under PCT article 21(2) was not published in English.

DESCRIPTION

The invention relates to a supporting leg for a working machine having a mast, and to a supporting construction having such a supporting leg.

Supporting legs of the type mentioned at the beginning serve for supporting working machines provided with a mast. If the mast is not in operation, the supporting legs are retracted in a space-saving manner into a supporting leg box such that they only protrude slightly, if at all, when the machine is shifted to a different location. If the working machine, for example a mobile concrete pump, is in operation, the extended supporting leg frequently has to absorb large forces which are transmitted via the supporting leg box and are conducted onto the ground. The force here is generally transmitted at two points from the supporting leg box to the supporting leg: the supporting leg lies above the supporting leg box in the region of the opening thereof and is supported at its rear end in the supporting leg box, on the bottom of the latter. Known supporting legs have a hollow body, at the end of which protruding from the supporting leg box a supporting foot protrudes downward. The hollow body is composed of vertically oriented web plates and horizontally oriented flange plates, wherein the flange plates are placed at the top and bottom onto the narrow sides of the web plates. In order to prevent buckling of the supporting leg at the points at which the force is introduced by the supporting leg box, the supporting leg has to be of particularly stable design, at said points. This is generally achieved by transverse partitions being welded in the supporting leg, which has the consequence that the supporting leg can be used only in those positions in which force is introduced in the region of the transverse partitions. This reduces the number of possible positions of the supporting leg. The working machine can generally be operated only with the supporting leg extended entirely, half extended or not extended at all. Fitting a multiplicity of transverse partitions into the supporting leg would disadvantageously increase the weight thereof.

It is therefore an object of the invention to develop a supporting leg of the type mentioned at the beginning in such a manner that a working machine equipped therewith can be used more flexibly. Furthermore, the intention is to provide a supporting construction which likewise permits more flexible usability of the working machine equipped therewith.

This object is achieved according to the invention by a supporting leg with the features described herein and a supporting construction with the features described herein, Advantageous developments of the invention are further described herein.

The invention is based on the concept of introducing the flow of forces via the supporting leg box directly via the exposed narrow sides into the web plates which, because of their vertical orientation, can absorb large downwardly acting forces. A flow of forces via the horizontally oriented flange plates, which are therefore more easily deformable by a vertical action of force, or via the weld seams connecting the flange plates to the web plates, as in the case of previously known supporting legs, is substantially avoided here. The supporting leg can therefore be used in virtually any desired position with respect to the supporting leg box, as a result of which improved support of the working machine in particular on narrow construction sites is possible. It is possible here for at least one of the flange plates to be connected at a distance from the narrow side of the web plates to the wide sides thereof such that said flange plate does not come into contact at all with the supporting leg box. However, it is also possible for an outer wide side of at least one of the flange plates to be aligned with a narrow side of each of the web plates.

According to the invention, the supporting construction is provided with two supporting strips which run at a distance from each other in a longitudinal direction, wherein the longitudinal direction runs parallel to the wide sides and to the narrow sides of the web plates and of the flange plates. One of the web plates in each case rests by its downwardly pointing narrow side on the upwardly directed supporting surfaces of the supporting strips. The supporting strips can be of correspondingly stable design without the entire bottom of the supporting leg box having to be of correspondingly stable and therefore very heavy design. In addition, the front side of the supporting leg box advantageously has a downwardly open, cross-sectionally U-shaped bracket, on the base of which, which connects the free limbs, a supporting surface for the upwardly directed narrow sides of the web plates is arranged. The U-shaped bracket can also be of very stable design without excessively increasing the weight of the supporting leg box. The supporting leg is then firstly supported in its rear region facing away from the supporting foot by the downwardly directed narrow sides of the web plates on the supporting surfaces of the supporting strips, while said supporting leg is supported in the region between the rear end and the supporting foot by the upwardly directed narrow sides of its web plates on the supporting surface of the bracket. Since the hollow body of the supporting leg has virtually the same stability over its entire length, it can be supported at virtually any desired point of the upwardly directed narrow sides of its web plates on the supporting surface of the bracket.

It is preferred for the supporting surface and the downwardly pointing narrow sides of the web plates to be in each case flat over the entire length thereof. The supporting surfaces are advantageously arranged at a distance above a bottom of the supporting leg box such that further components can be accommodated in the region between the supporting strips and the bottom. For example, the supporting leg can have a guide strip which protrudes downward from the hollow body and is guided between the bottom of the supporting leg box and the supporting strips and/or between the supporting surface and improves the guidance of the supporting leg in the supporting leg box. In addition, a position-measuring device for measuring a travel of the supporting leg box can be arranged between the bottom of the supporting leg box and the supporting surfaces. Said position-measuring device advantageously has two toothed wheels which are mounted on the supporting leg box and over which a chain endlessly revolves, said chain being connected by a driver to the supporting leg, wherein one of the toothed wheels is provided with a counting device for counting the revolutions thereof. The travel and therefore the position of the supporting leg with respect to the supporting leg box can thereby easily be measured. The position measurement can be used for a process for automatically controlling the mast of the working machine, in which process a control device determines the position of the supporting leg with respect to the supporting leg box and, with reference to the respectively determined value, specifies a possible pivoting range of the mast, wherein pivoting of the mast outside the specified pivoting range is then blocked.

In an advantageous manner, at least one of the web plates and preferably both web plates are or is provided on the outer wide side, which faces away from the other web plate in each case, with a groove which runs in the longitudinal direction and into which a wear element is inserted, which wear element can be manufactured from corrosion-resistant material, such as, for example, stainless steel or plastic. In addition, at least one guide pin protrudes inward from the supporting leg box in order to improve the guidance of the supporting leg during the displacement thereof by bearing against or sliding along the respective wear element.

The supporting leg box is expediently open to a rear side opposite the front side, and the hollow body of a further supporting leg is accommodated in the supporting leg box and protrudes to the rear side. The hollow body of the further supporting leg is likewise mounted displacably in the longitudinal direction and rests with the downwardly directed narrow sides of its web plates on the supporting surfaces of the supporting strips. In particular, the supporting leg box can be mirror-symmetrical with respect to a center plane running perpendicularly to the longitudinal direction. The working machine can then be supported toward both sides by such a supporting construction, wherein the supporting legs are movable in the supporting leg box in a virtually infinitely variable manner to both sides.

The extension and retraction of the supporting legs generally takes place by means of drive cylinders, the cylinder eyes of which are in each case fastened to the supporting leg box by means of a bolt. In the case of supporting constructions having two supporting legs which are extendable in opposite directions, two drive cylinders are required which are each fastened by their cylinder eye to the supporting leg box by means of a bolt. By each cylinder eye being fastened with a dedicated bolt to the supporting leg box, the supporting leg box has to be configured to be correspondingly longer. This is remedied according to the invention by the fact that the two working cylinders are fastened at their cylinder eyes to the supporting leg box by means of a common bolt. A length saving of approximately 10 cm can thereby be obtained, and therefore each of the supporting legs can be designed to be approximately 5 cm longer than previously known supporting constructions. This aspect according to the invention can be realized independently of the above-described invention or can advantageously be combined therewith.

The invention is explained in more detail below with reference to an exemplary embodiment which is illustrated schematically in the drawing, in which FIGS. 1a, 1b show a supporting construction with two supporting legs, a supporting leg box. and a bearing block, which is placed on the supporting leg box, for a mast, and a partially cut-open illustration of a detail;

Figure 1:
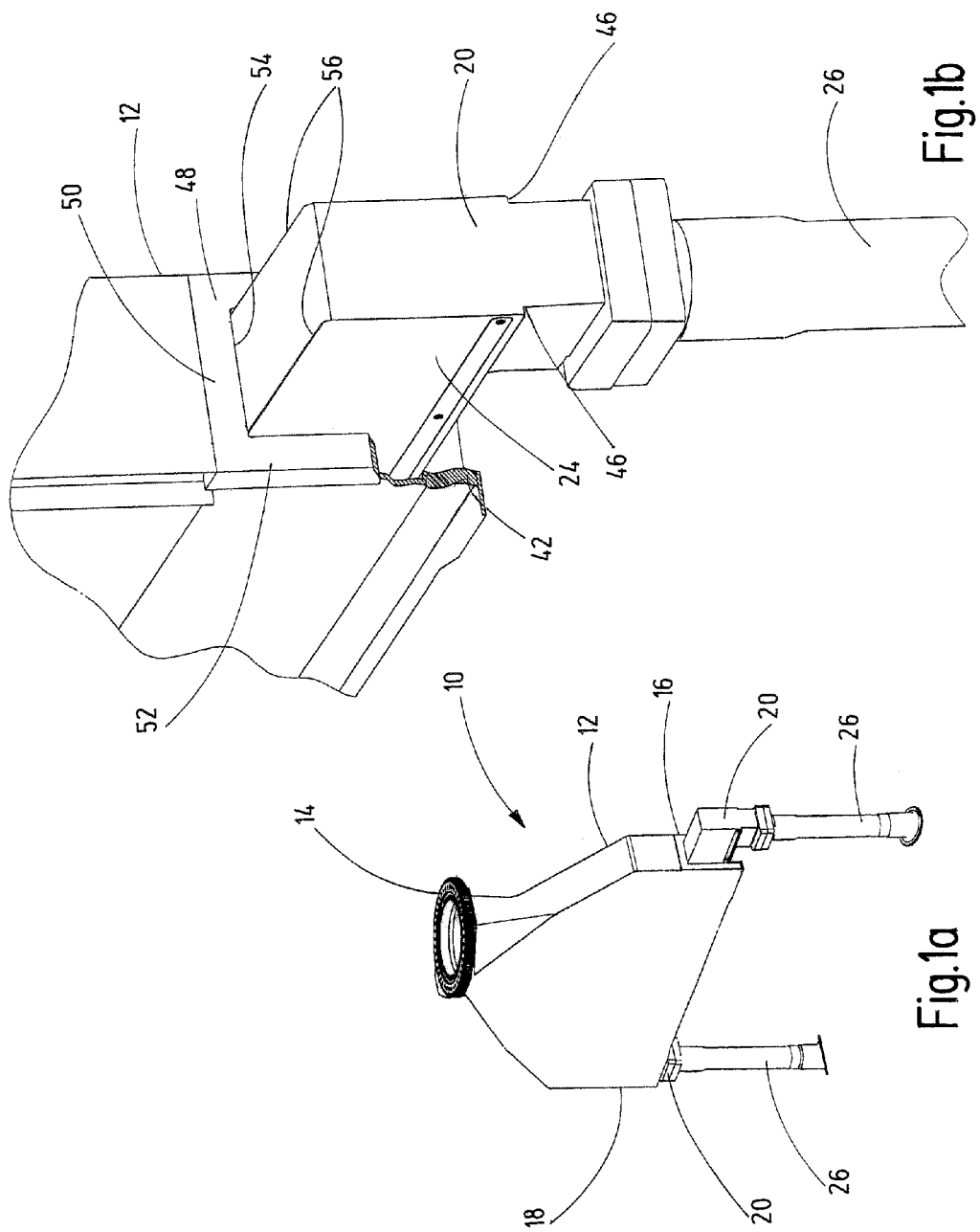

FIG. 1a illustrates a supporting construction 10 for a working machine having a mast and a supporting leg box 12 and a bearing block 14, which is mounted on the supporting leg box 12, for the mast. The supporting leg box 12 is open toward a front side 16 and toward a rear side 18, and two identically designed supporting legs 20 are accommodated therein. The supporting legs 20 each have a hollow body 24, which extends in a longitudinal direction 22 and is displaceable in the longitudinal direction 22 in the supporting leg box 12, and a downwardly protruding supporting foot 26 mounted at a front end of the hollow body 24. Each of the hollow bodies 24 is composed of two web plates 28 running parallel to and at a distance from each other and two flange plates 30 which run parallel to and at a distance from each other and connect the web plates 28 to each other. Each of the web plates 28 has two vertically arranged wide sides 32 facing away from each other and two horizontally arranged narrow sides 34 connecting the wide sides 32 to each other. The flange plates 30 each have two horizontally running wide sides 36 facing away from each other and two vertically arranged narrow sides 38 connecting the wide sides 36 to each other. The flange plates 30 are arranged here between the web plates 28 in such a manner that their narrow sides 38 bear against the mutually facing wide sides 32 of the two web plates 28, wherein the two flange plates 30 are arranged at a distance from the narrow sides 34 of the web plates 28. The web plates 28 and the flange plates 30 are in each case connected to one another by weld seams 40.

Figure 2:
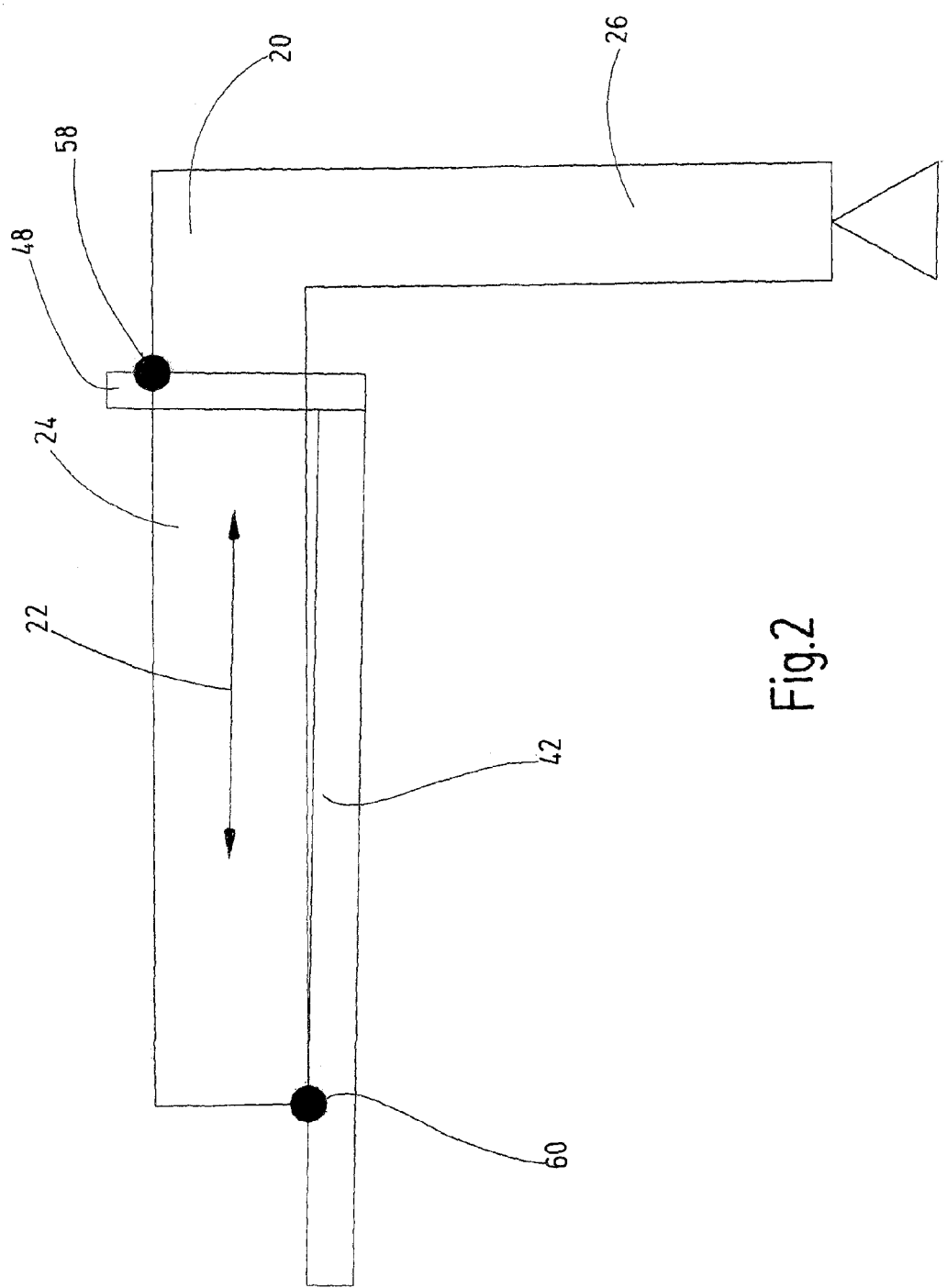
FIG. 2 shows a schematic diagram which shows the supporting points of a supporting leg on the supporting leg box.
Figure 3:
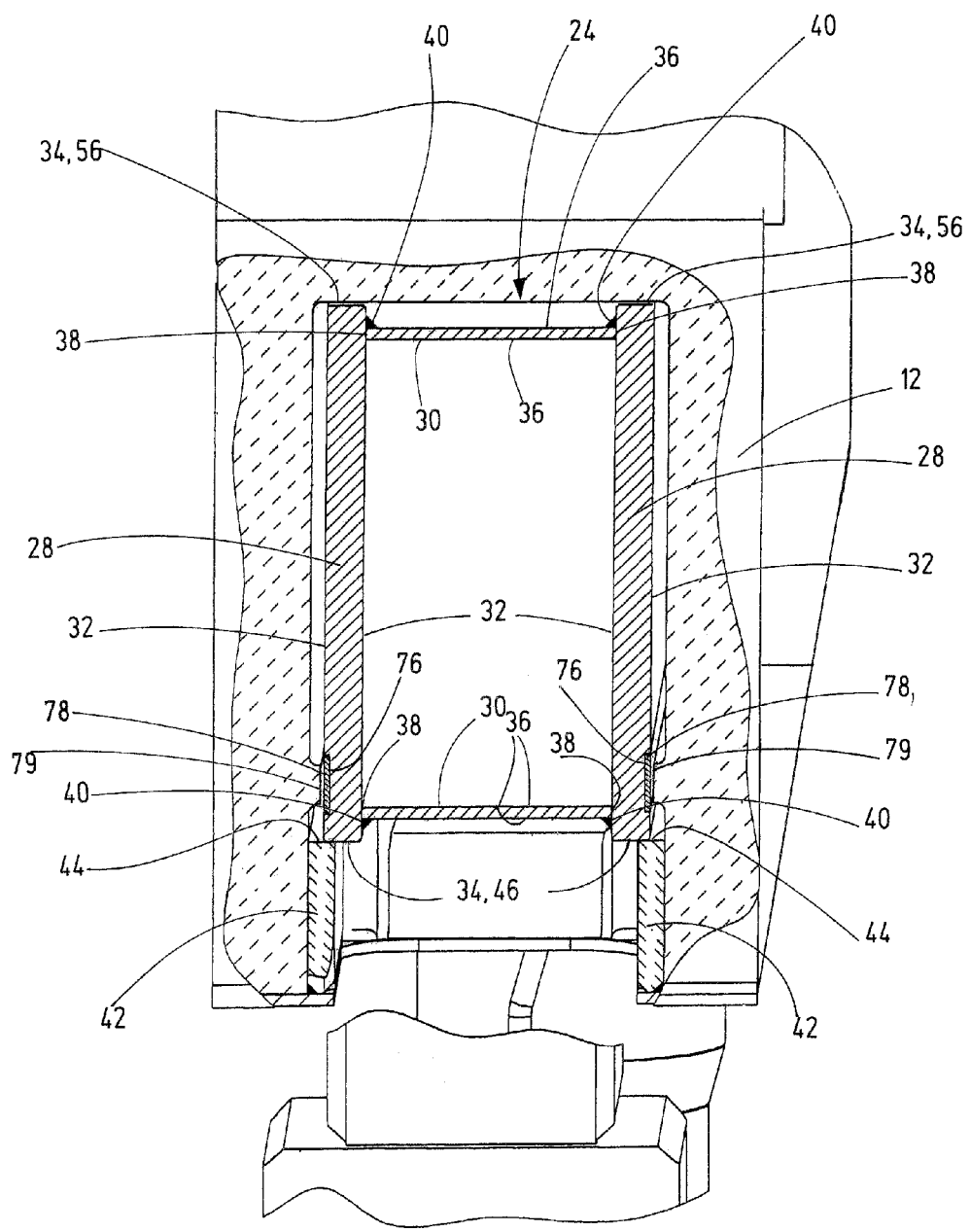
FIG. 3 shows a cross-sectional illustration of the supporting construction according to FIGS. 1a, 1b.
Figure 4:
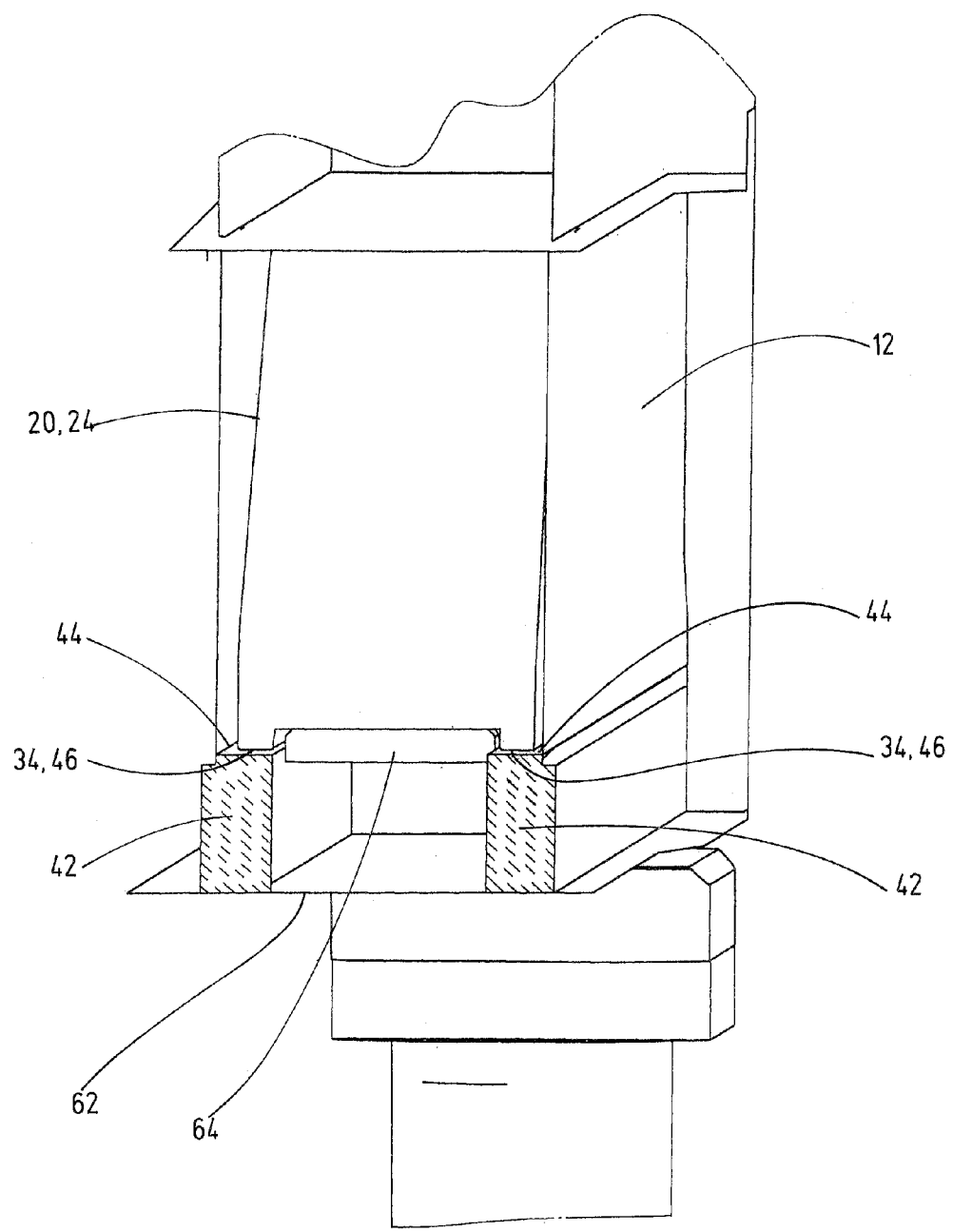
FIG. 4 shows an illustration of the rear end of a supporting leg accommodated in the supporting leg box.
Figure 5:
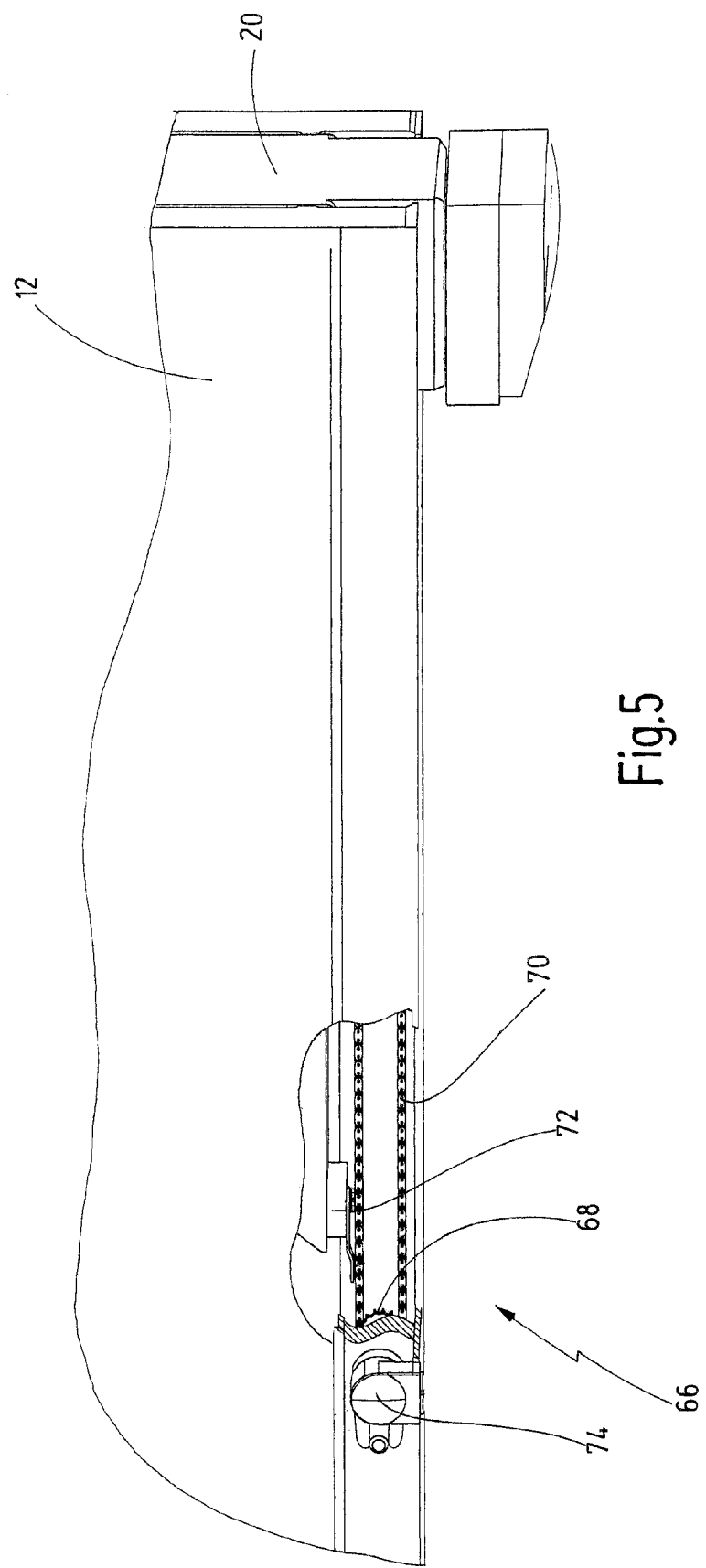
FIG. 5 shows a schematic illustration of a position-measuring device of a supporting construction according to FIGS. 1a, 1b.
Figure 6:
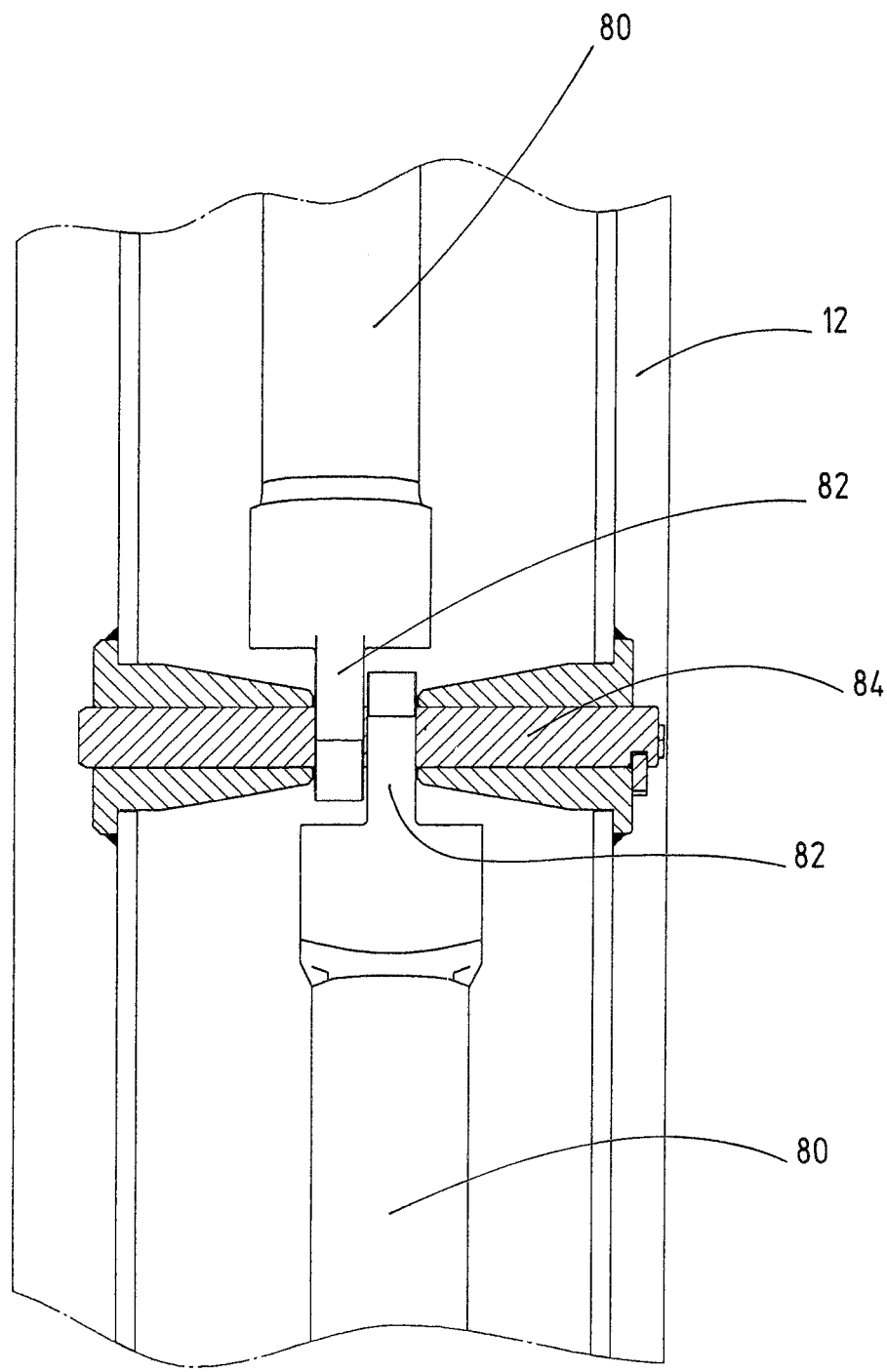
FIG. 6 shows a schematic illustration of the fastening of the drive cylinders of two supporting legs to the supporting leg box.

As illustrated in FIGS. 3 and 4, the supporting leg box 12 has two supporting strips 42 which run at a distance from each other in the longitudinal direction 22 and each have an upwardly directed horizontal supporting surface 44. One of the web plates 28 rests in each case with, a lower bearing surface 46, which is formed by its lower horizontal narrow side 34, on the supporting surfaces 44. The supporting surfaces 44 and the lower bearing surfaces 46 are each of flat design here over the entire length thereof. On the front side 16 and the rear side 18, the supporting leg box 12 has a U-shaped bracket 48, which is open downward, and a base 50 and also free limbs 52 protruding downward from the base 50. The lower side of the base 50 forms a supporting surface 54 on which the upper bearing surfaces 56 of the web plates 28, which bearing surfaces are formed by the upper horizontal narrow sides 34 of the web plates 28, are supported. If the relevant supporting leg 20 absorbs load, it is supported, as FIG. 2 illustrates, on front and rear supporting points 58, 60 on the supporting leg box 12. The front supporting points 58 are located here on the supporting surface 54 of the bracket 48 while the rear supporting points 60 are located on those points of the supporting surfaces 44 on which the rear end of the supporting leg 20 rests with the lower bearing surfaces 46.

The supporting surfaces 44 are arranged at a distance from a bottom 62 of the supporting leg box 12 such that further components can be accommodated between the supporting legs and the bottom 62. A guide strip 64 is thus arranged at the rear end of each supporting leg 20, said guide strip protruding downward from the lower flange plate 30, being guided between the supporting strips 42 and permitting more precise guidance of the respective supporting leg 20 in the supporting leg box. Furthermore, a position-measuring device 66 which has two toothed wheels 68 and an endlessly revolving chain 70 stretched over the toothed wheels 68 is arranged between the respective supporting leg 20 and the bottom 62. A driver 72 fastened to the respective supporting leg 20 moves the chain 70 during a displacement of the supporting leg 20 in the longitudinal direction 22. A counting device 74 counts the revolutions of one of the toothed wheels 68 and thus calculates the travel of the supporting leg 20. A control device can be provided here which, with reference to the data determined by the position-measuring device 66, determines the position of the supporting leg 20 with respect to the supporting leg box 12 and, on the basis of the values determined, specifies a possible pivoting range of the mast.

In addition, the web plates 28 are in each case provided, on their outer wide sides 32 facing away from one another, with a groove 76 which runs in the longitudinal direction 22 and into which a wear element 78 in the form of a strip ending flush with the wide side 32 is inserted. During the displacement of the supporting leg 20 a guide pin 79 which protrudes inward from the supporting leg box 12 slides on each of the strips 78 in order further to improve the longitudinal guidance of the supporting leg 20. The strips 78 which are exposed to increased wear due to abrasion are not painted, but rather are manufactured from corrosion-resistant material, for example stainless steel or plastic.

In order to extend and retract the supporting legs 20 from or into the supporting leg box 12, a drive cylinder 80 for each supporting leg 20 is arranged in the supporting leg box 12. Each of the drive cylinders is connected at its cylinder eye 82 to the supporting leg box 12. For this purpose, a common bolt 84 is provided which connects the two cylinder eyes 82 to the supporting leg box 12.

Figure 7:
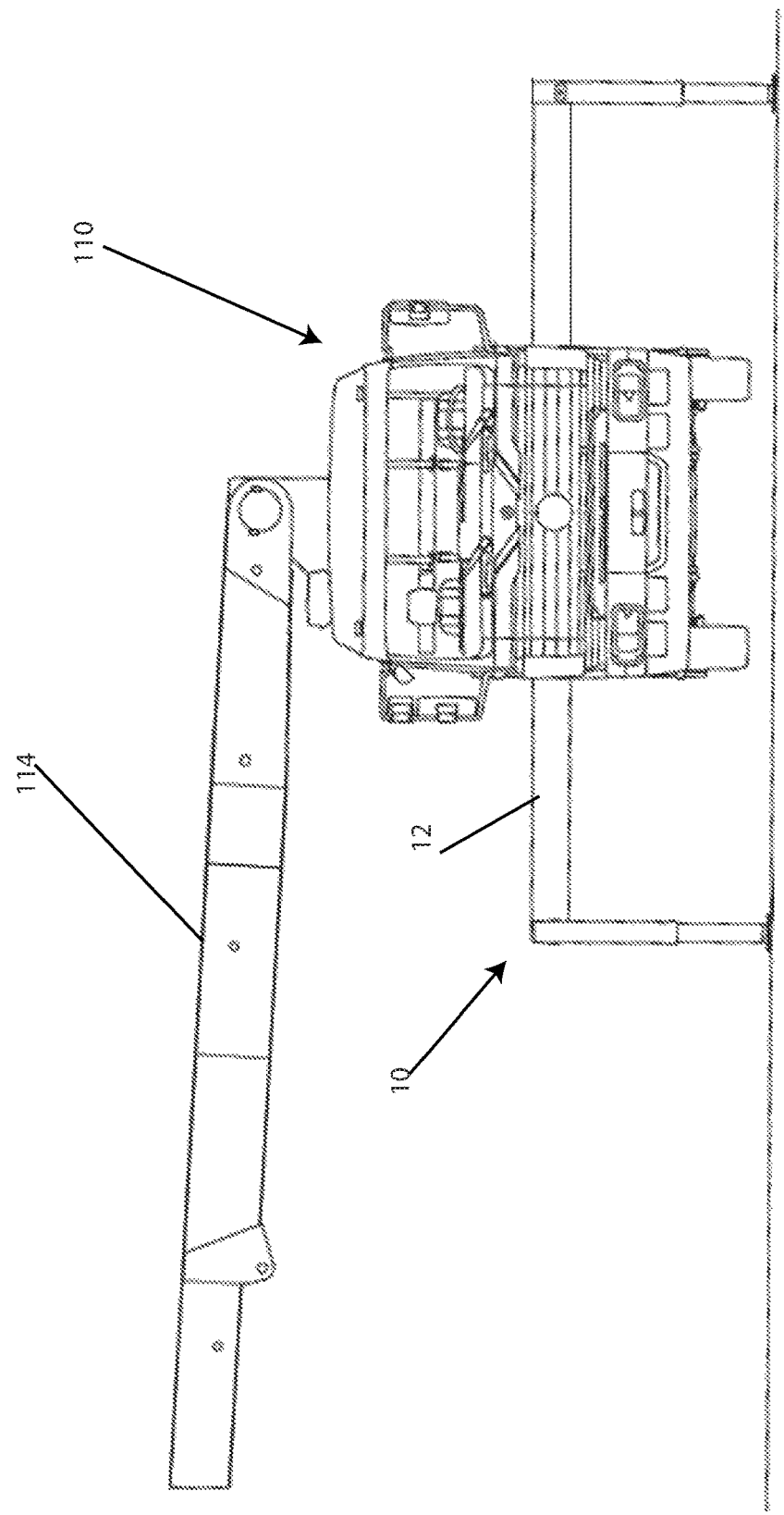
FIG. 7 shows a supporting leg and a supporting construction working in conjunction with a working machine having a mast.

FIG. 7 shows the supporting construction 10 and the supporting leg box 12 when used to support a working machine 110 having a mast 114. In this example, the working machine 110 is a truck and the viewpoint shows the supporting constructions 10 supporting the weight of the working machine 110 and holding the working machine 110 in the air.

The following should be stressed in summary: the invention relates to a supporting leg 20 for a working machine having a mast, with a hollow body 24 which is composed of two web plates 28, which are arranged at a distance from each other, and two flange plates 30, which connect the web plates 28 to each other, are arranged at a distance from each other, and are connected to the web plates 28 by means of weld seams 40, and with a supporting foot 26 protruding downward from the hollow body 24, wherein the web plates 28 in each case have two substantially vertically arranged wide sides 32 and two substantially horizontally arranged narrow sides 34 connecting the wide sides 32 to each other, and wherein the flange plates 30 in each case have two substantially horizontally arranged wide sides 36 and two substantially vertically arranged narrow sides 38 connecting the wide sides 36 to each other. According to the invention, it is provided that the flange plates 30 each bear with their narrow sides 36 against mutually facing wide sides 32 of the web plates 28, and in that the narrow sides 34 of the web plates 28 are exposed and form lower and upper bearing surfaces 46, 56 of the hollow body 24.

The invention claimed is:

1. A supporting leg for a working machine having a mast, with a hollow body which is composed of two web plates, which are arranged at a distance from each other, and two flange plates, which connect the web plates to each other, are arranged at a distance from each other, and are connected to the web plates via weld seams, and with a supporting foot protruding downward from the hollow body,
wherein the web plates in each case have two substantially vertically arranged wide sides and two substantially horizontally arranged narrow sides connecting the wide sides to each other,
wherein the flange plates in each case have two substantially horizontally arranged wide sides and two substantially vertically arranged narrow sides connecting the wide sides to each other,
wherein the flange plates each bear with the narrow sides against mutually facing wide sides of the web plates,
wherein the narrow sides of the web plates are exposed and form lower and upper bearing surfaces of the hollow body, and
wherein an upper flange plate of the two flange plates is connected to the web plates at a distance from upwardly directed narrow sides of the narrow sides of the web plates and/or a lower flange plate of the two flange plates is connected to the web plates at a distance from downwardly directed narrow sides of the narrow sides of the web plates.

2. The supporting leg as claimed in claim 1, wherein an outer wide side of one of the flange plates is aligned with a narrow side of each of the web plates.

3. A supporting construction for a working machine having a mast,
with a supporting leg as claimed in claim 1, and
with a supporting leg box which partially accommodates the hollow body of the supporting leg and is open to a front side,
wherein the hollow body is mounted in the supporting leg box so as to be displaceable in a longitudinal direction running parallel to the wide sides and to the narrow sides of the web plates and the flange plates, and projects to the front side,
wherein the supporting foot is arranged outside the supporting leg box,
wherein the supporting leg box has two supporting strips which extend at a distance from each other in the longitudinal direction and comprise upwardly directed supporting surfaces,
wherein one of the two narrow sides of the web plates in each case is a downwardly pointing narrow side,
wherein the one of the web plates rests via the downwardly pointing narrow side on the upwardly directed supporting surfaces of the two supporting strips of the supporting leg box,
wherein the front side of the supporting leg box has a downwardly open, cross-sectionally U-shaped bracket having free limbs and a base connecting the free limbs, and
wherein the base comprises a supporting surface resting directly on the upwardly directed narrow sides of the narrow sides of the web plates.

4. The supporting construction as claimed in claim 3, wherein the supporting surfaces and the downwardly pointing narrow sides of the web plates are in each case flat over the entire length thereof.

5. The supporting construction as claimed in claim 3, wherein the supporting surfaces are arranged at a distance above a bottom of the supporting leg box.

6. The supporting construction as claimed in claim 5, wherein the supporting leg has a guide strip which protrudes downward from the hollow body and is guided between a bottom of the supporting leg box and the supporting surfaces and/or between the supporting strips.

7. The supporting construction as claimed in claim 5, wherein a position-measuring device for measuring a travel of the supporting leg is arranged between the bottom of the supporting leg box and the supporting surfaces.

8. The supporting construction as claimed in claim 7, wherein the position-measuring device has two toothed wheels which are mounted on the supporting leg box and over which a chain endlessly revolves, said chain being connected via a driver to the supporting leg, and
wherein one of the toothed wheels is provided with a counting device for counting the revolutions thereof.

9. The supporting construction as claimed in claim 3, wherein at least one of the web plates is provided on the outer wide side, which faces away from the other web plate, with a groove which runs in the longitudinal direction and into which a wear element is inserted, and
wherein at least one guide pin for bearing against the respective wear element protrudes inward from the supporting leg box.

10. The supporting construction as claimed in claim 3, wherein the supporting leg box is open to a rear side opposite the front side,
wherein the hollow body of a further supporting leg is accommodated in the supporting leg box and protrudes to the rear side, and
wherein the hollow body of the further supporting leg is mounted displaceably in the longitudinal direction and rests with the downwardly pointing narrow sides of the web plates on the supporting surfaces.

11. The supporting construction as claimed in claim 10, wherein each of the supporting legs is displaceable via a drive cylinder arranged in the supporting leg box, and
wherein the two drive cylinders comprise cylinder eyes and are fastened at the cylinder eyes to the supporting leg box via a common bolt.

12. A method for controlling a mast of a working machine provided with a supporting construction as claimed in claim 3, wherein a control device determines the position of the supporting leg or of the supporting legs with respect to the supporting leg box and, with reference to the determined values, specifies a possible pivoting range of the mast.

* * * * *